July 16, 1929.  P. DELANEY  1,721,006
EMERGENCY TIRE
Filed Dec. 22, 1927
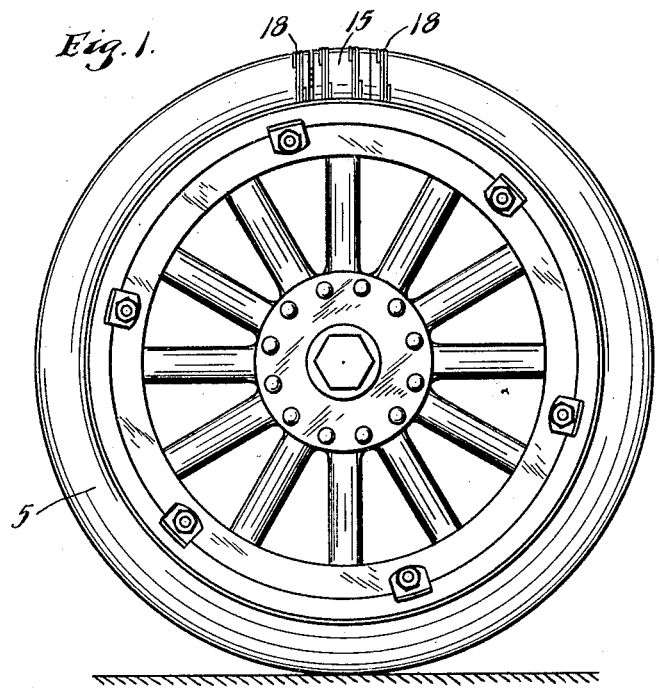
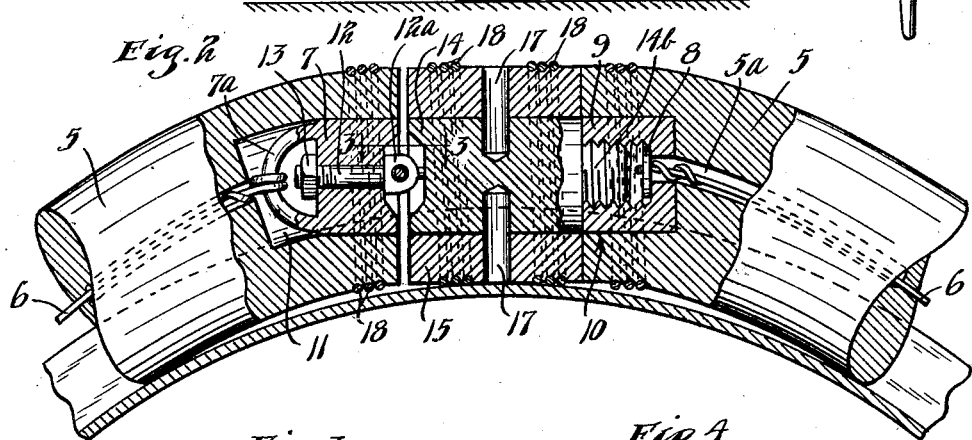
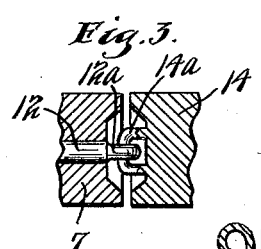
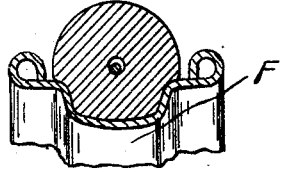
INVENTOR.
PAUL DELANEY.
BY HIS ATTORNEYS.
Williamson Reid Williamson Patented July 16, 1929.

1,721,006

UNITED STATES PATENT OFFICE.

PAUL DELANEY, OF DARWIN, MINNESOTA.

EMERGENCY TIRE.

Application filed December 22, 1927. Serial No. 241,877.

This invention relates to vehicle tires and especially to emergency tires for a motor vehicle adapted to be temporarily utilized when the usual pneumatic tires have become punctured or otherwise injured in driving.

Spare tires heretofore have been bulky, difficult to put on the wheels and have required racks or other means of support on the body of the automobile. Relatively few cars carry more than one spare tire and in most cases it is comparatively easy for a person to steal the spares from a car without attracting notice. Furthermore, the spare if punctured will have no utility.

It is the main object of my invention to provide an extremely simple but highly efficient emergency tire which will be puncture proof, capable of being readily attached to the wheel of a tire, and which further may be compactly carried, occupying little space.

A more specific object of my invention is to provide an emergency tire of the class described comprising an elongated flexible member having a considerable degree of compressibility and resiliency, which may be quickly secured about a vehicle wheel to snugly fit the same, and which when not in use may be carried in any convenient place within the automobile body such as beneath the seat.

A still further object is to provide a device of the class above described, which will be strong, durable and economical, and have means included therein for adjustably clamping the device tightly against the vehicle rim.

These and other objects and advantages of the invention will be apparent from the following description made in connection with the accompanying drawings in which like reference characters refer to similar parts throughout the several views and in which:

Fig. 1 is a front elevation of a vehicle wheel having a preferred embodiment of my invention applied thereto;

Fig. 2 is a fragmentary view on a larger scale of a rim with said attachment thereon, some parts being broken away and others shown in section, illustrating the means for connecting the ends of the tire and drawing the same tightly together around the vehicle rim;

Fig. 3 is a horizontal section taken on the line 3—3 of Fig. 2;

Fig. 4 is a detail view showing the means for anchoring one end of the cable or reinforcing member within the tire;

Fig. 5 is a detail view showing a simple form of tool for operating the take up means; and Fig. 6 is a cross section showing a modified application of my emergency tire to the felly of a wheel.

The body of my emergency tire preferably comprises an elongated section 5, of resilient material such as pliable rubber and of circular cross section. The length of section 5 is sufficient to very nearly surround the rim of a vehicle wheel and this body is provided with a concentric bore $5^a$ extending throughout the length thereof. A relatively non-stretchable flexible reinforcing and binding member 6, such as a cable or wire extends throughout the entire length of body 5 having one of its ends connected to a loop $7^a$ at the inner end of a relatively small plug 7 and having its opposite end connected to an anchoring button or washer 8, which may be disposed in the inner end of a hollow plug member 9. The two opposing ends of body 5 are provided with concentric cylindrical recesses 10 and 11 respectively of substantially equal diameter to the diameters of plugs 9 and 7 respectively and said plugs fit snugly within said recesses, their outer ends lying substantially flush with the ends of body 5. Plug 7 is provided with a concentric bore through which a swivel bolt 12 is passed, the inner extremity of said bolt being threaded to engage a retaining nut 13 disposed at the inner end of plug 7. The outer end of swivel bolt 12 carries an eye $12^a$ which is linked with an eye or loop $14^a$ affixed to one end of a short take up cylinder 14. Cylinder 14, as shown, is of substantially the diameter of plugs 7 and 9 and is provided with an annular casing 15 of soft rubber or other resilient material, said casing being of equal diameter to the body 5 of my tire. Cylinder 14 terminates at its right hand end in a screw $14^b$ which is adapted to threadedly engage the interior of plug 9.

Concentric recesses are formed in the opposing ends of plug 7 and cylinder 14 to accommodate the link eyes $12^a$ and $14^a$, so that said plug and cylindrical members may be disposed in juxtaposition.

Diametrically extending passages 17 are formed in casing 15 extending partially through cylinder 14 for the reception of a small bar or tool T by which cylinder 14 may be turned.

To firmly secure plugs 7 and 9 within the ends of the body 5 and to firmly secure cylinder 14 within the annular casing 15 I provide suitable retaining means, such as wire windings 18 which are tightly drawn about the resilient members mentioned.

The operation and use of my device, although perhaps obvious from the foregoing description, will be briefly described as follows:

It will be apparent that being of flexible nature the device may be folded into compact form and carried in a convenient place in the automobile body. In the event that one of the pneumatic tires of the automobile becomes punctured the casing may be easily removed from the rim and my emergency tire mounted thereon, as shown in Fig. 1. The body 5 is wrapped about the rim and the ends drawn as tightly as possible together after which screw 14$^b$ may be caused to threadedly engage the plug 9.

A bar or tool T may then be inserted in one of the passages 17 and cylinder 14 rotated to cause the end of the body containing plug 9 to be drawn about the wheel or rim into close relation with the adjacent end of the annular casing 15. Flexible member 6 is constructed of some material, such as cable which will resist stretching and the body 5 may thus be bound very tightly to the wheel or rim. Obviously, the binding of said body is rendered adjustable due to the swivel cylinder carrying the screw plug 14$^b$.

With my device it will be seen that a substantially unbroken traction surface will be provided, since the cylindrical take up section, including the casing 15, which is of equal diameter to the body of the device, may be abutted closely against the right hand end of the body 5 which carries the threaded socket plug 9.

While in Figs. 1 and 2 my emergency tire is shown applied to a standard tire rim, it is obvious that the invention will have application directly on the felly of the wheel, as shown in Fig. 6. In this case the tire must be applied to a felly F having a peripheral groove. Some fellies on the market at this time are provided with such a groove and it would be comparatively expedient to groove other fellies suitably to tightly bind my emergency tire thereon. In this form the cross sectional shape of body 5 is made to substantially conform with the felly upon which it is applied.

From the foregoing description it will be apparent that I have provided a simple but efficient emergency tire adapted to be quickly and easily installed upon the wheel of a motor vehicle and capable of giving limited service until a punctured pneumatic tire can be repaired. My device is not, of course, intended for extensive driving but will adequately enable the driver to reach the nearest town or the nearest garage without difficulty. As set forth the tire may be folded into a compact bundle and conveniently carried within the automobile body.

It will, of course, be understood that various changes may be made in the form, details, arrangement and proportions of the parts within the scope of the claims without departing from the scope of the invention.

What is claimed is:

1. An emergency tire for motor vehicles comprising an elongated body of relatively resilient and flexible material, and a take up member securing the ends of said body together, said take up member including a cylindrical section of equal diameter to the diameter of said body and drawing the ends of said body together and into abutment with its ends when turned in one direction, whereby a substantially unbroken traction surface is provided.

2. An emergency tire for motor vehicles comprising an elongated flexible body of resilient material, a flexible, relatively non-stretchable member longitudinally extended through said body, a take up element interposed between the ends of said body and connected with the ends of said flexible member drawing the ends of said body together, said take up member including a resilient element of cylindrical external shape and of equal diameter to said body, whereby a substantially unbroken traction surface is provided.

3. An emergency tire for motor vehicles comprising, an elongated flexible body of resilient material, a flexible, relatively non-stretchable member longitudinally extended through said body, a take up section of equal external diameter to the diameter of said body, said section comprising a core swivelly connected with one end of said flexible member and having threaded engagement with means secured to the opposite end of said flexible member, and an annular casing of resilient material, and means to facilitate turning of said take up section whereby the ends of said body are drawn into abutment with the ends of said take up section when the latter is turned in one direction.

In testimony whereof I affix my signature.

PAUL DELANEY.